J. ROBSON.
CONTINUOUS CYCLE AMMONIA POWER OR REFRIGERATING APPARATUS.
APPLICATION FILED NOV. 19, 1906.

913,165.

Patented Feb. 23, 1909.
7 SHEETS—SHEET 4.

*Fig. 2.*

J. ROBSON.
CONTINUOUS CYCLE AMMONIA POWER OR REFRIGERATING APPARATUS.
APPLICATION FILED NOV. 19, 1906.

913,165.

Patented Feb. 23, 1909.
7 SHEETS—SHEET 6.

Fig. 2b

J. ROBSON.
CONTINUOUS CYCLE AMMONIA POWER OR REFRIGERATING APPARATUS.
APPLICATION FILED NOV. 19, 1906.

913,165.

Patented Feb. 23, 1909.
7 SHEETS—SHEET 7.

UNITED STATES PATENT OFFICE.

JOHN ROBSON, OF WALLSEND, ENGLAND, ASSIGNOR TO CLARKE, CHAPMAN & COMPANY LIMITED, OF GATESHEAD, ENGLAND.

CONTINUOUS-CYCLE AMMONIA POWER OR REFRIGERATING APPARATUS.

No. 913,165.     Specification of Letters Patent.     Patented Feb. 23, 1909.

Application filed November 19, 1906. Serial No. 344,087.

*To all whom it may concern:*

Be it known that I, JOHN ROBSON, a subject of the King of England, residing at Wallsend, in the county of Northumberland, England, have invented a certain new and useful Continuous-Cycle Ammonia Power or Refrigerating Apparatus, of which the following is a specification.

This invention consists in various improvements in continuous cycle ammonia apparatus, which may be used for power or refrigerating purposes, of that class in which part of the liquefied ammonia is used as a source of motive power to work an engine or motor in connection with or forming part of the apparatus.

The improvements consist in certain combinations of apparatus and in detail improvements in the construction of the several parts thereof more especially indicated in the claims.

In the annexed drawings on six sheets: Sheets 1, 2, 3 Figures 1, 1$^a$, 1$^b$ show the elevation of the apparatus with many parts in section; Sheets 4, 5, 6 Figs. 2, 2$^a$, 2$^b$ show a plan thereof. Figs. 3 and 4 are detail views in section on an enlarged scale of valves 52 and 94 hereinafter referred to.

2 is a gas producer, 3 a boiler for vaporizing ammonia, 4 a blower or fan, 5 cylinder for working the ammonia pump 6 and the water circulating pump 7.

8 is a receiver for ammonia vapor, 9 a heat exchanger, 10 an absorber for strong solution of ammonia; 11 an absorber for weak solution of ammonia, 12 a receiver for anhydrous liquid ammonia. 13 a condenser in which ammonia gas is cooled and liquefied by pressure, 14 a cooler for the exhaust from the engine or motor 15, and 16 is a water tank.

The gas producer 2 is of known kind except that the dished plate 18 of the water vaporizing chamber 17 is different in construction having a baffle 128 to spread the water. The air from blower 4 is conveyed by pipe 48 to a hollow belt 19, thence by pipes 20 into the vaporizing chamber 17 and there mixed with water-vapor. The mixture of air and water-vapor passes into the annular space 21, thence by pipes 22 into the space between the inner shell 23 and the intermediate shell 24, thence by the pipes 25 to the annular space 26, and through the slots 27, and fire grate 28 into the fire space 29.

30 indicates a fireclay lining, 31 the outer shell of the producer and 32 the coal feeding hopper. 33 is a cover for the latter, 34 a valve or bell for the hopper actuated through rod 36 by hand lever 35 pivoted at 37.

38 is a water lute at the bottom of the fire grate which allows the ashes to be removed without interfering with the continuous working.

The gas passes from chamber 29 to the space between shells 24 and 31, thence through the dust separator 39 and by pipe 40 through perforated grate 41 into the combustion chamber of the boiler 3.

42 indicates air passages through grate 41. 43 throttle valve in pipe 40. 44 uptake or chimney in pipe 40 and open to atmosphere.

45 is a throttle valve in the uptake 44. This valve is only open when the apparatus as a whole is not working and it is required to keep a small fire in the chamber 29 of the gas producer.

46 is a water pipe from tank 16. 47 drip pipes leading into the water vaporizing chamber 17.

49 is a motor for working the blower 4.

50 is a supply pipe to the motor 49 from the ammonia vapor receiver 8.

51 is a stop valve in pipe 50.

52 (shown in section in Fig. 3) is a piston valve in pipe 50 for controlling the supply to motor 49.

Figure 1:
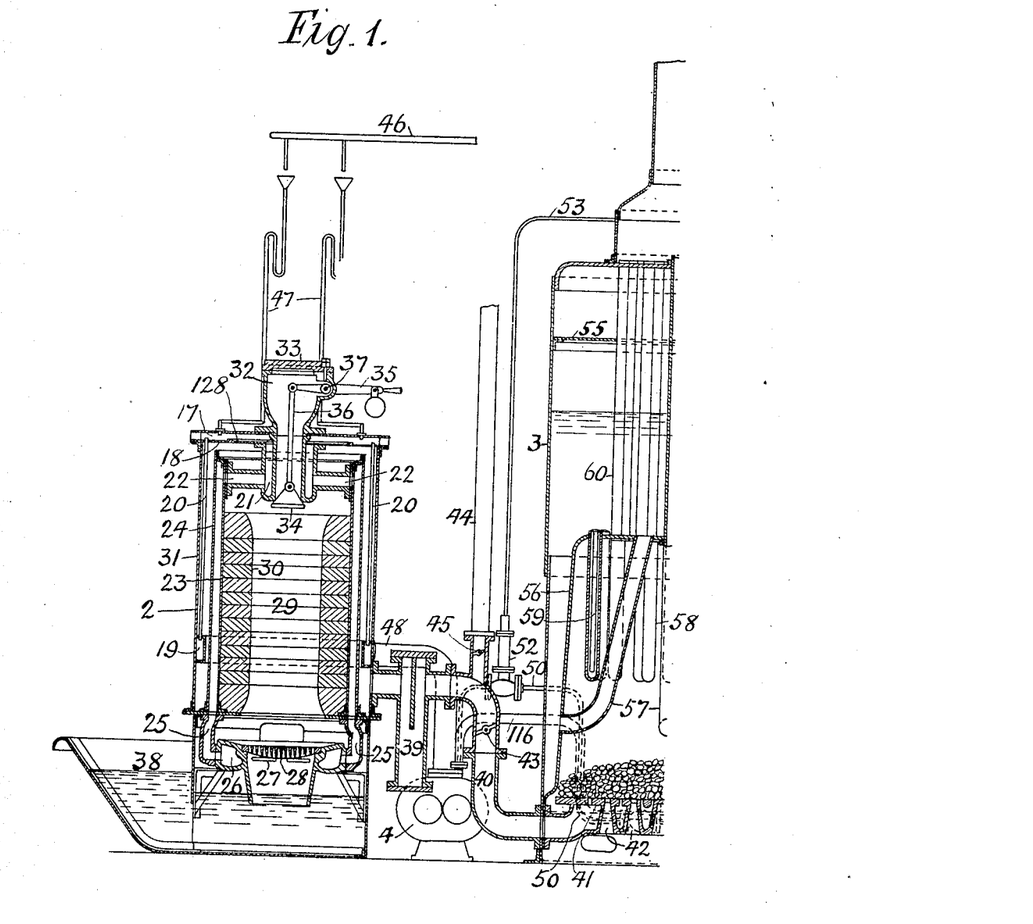
Figure 1A:
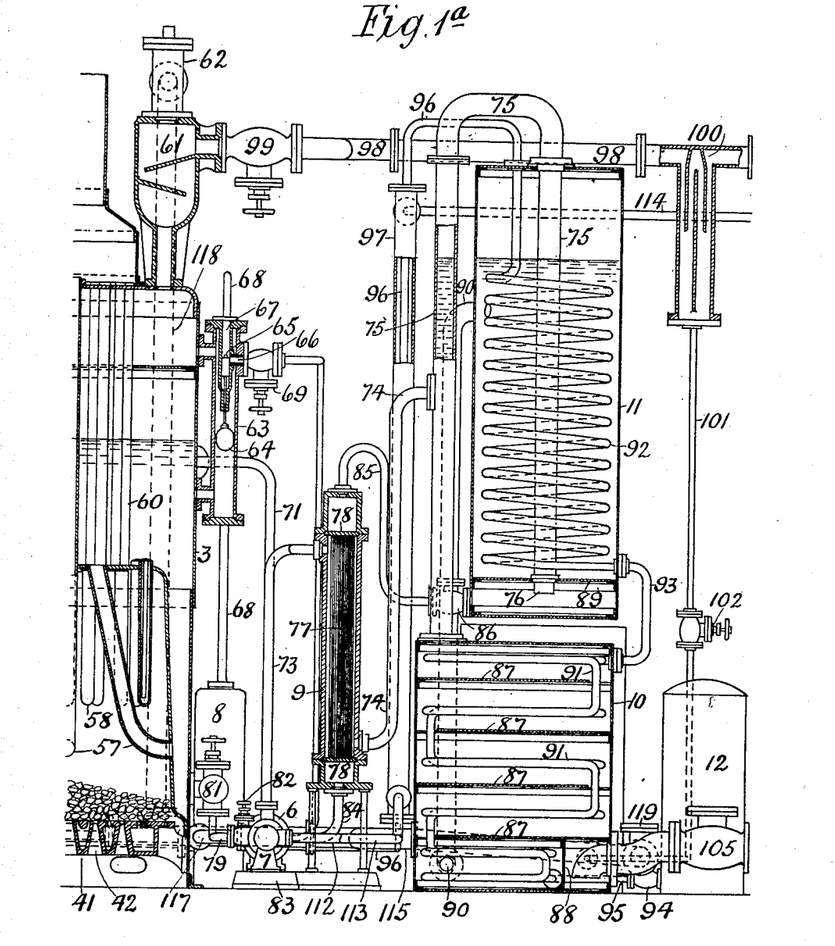
Figure 1B:
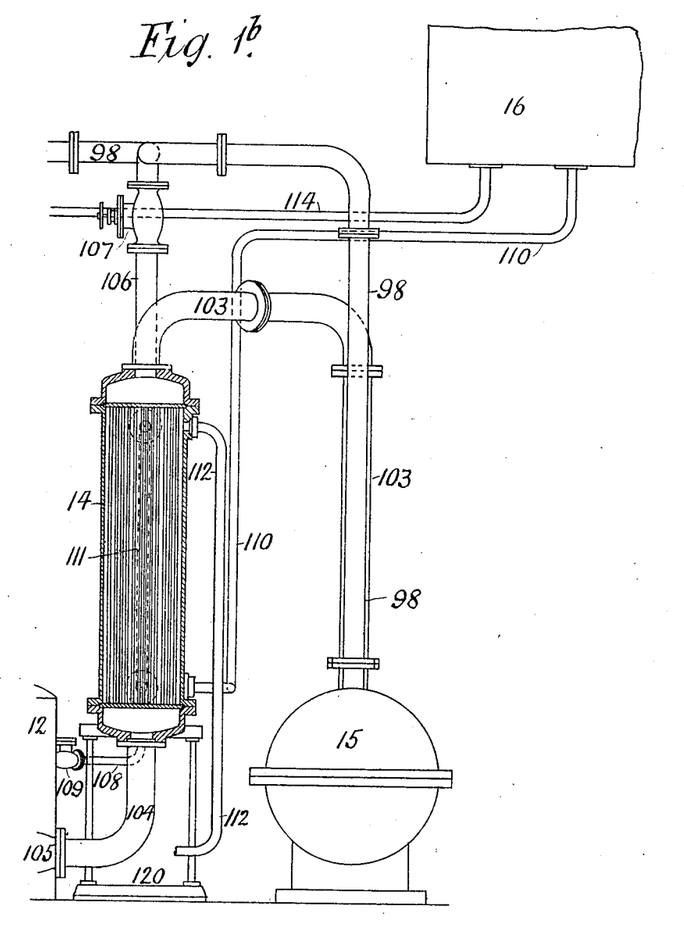
Figure 2:
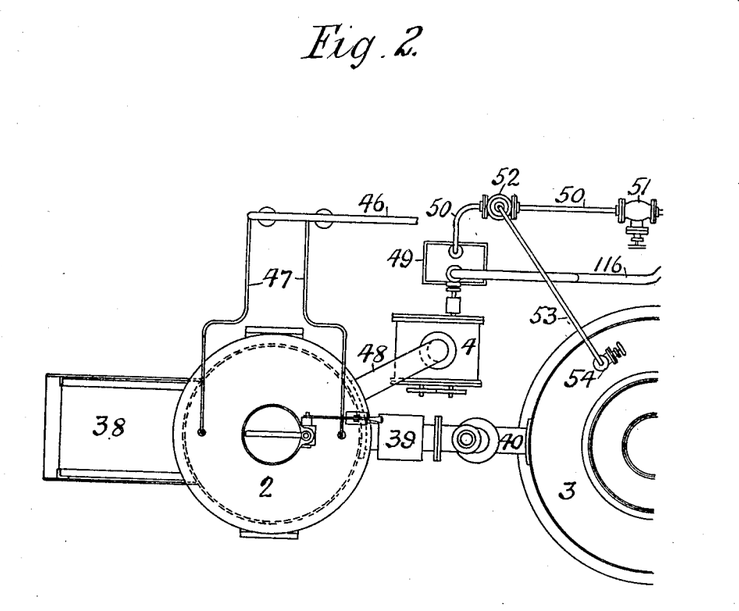
Figure 2A:
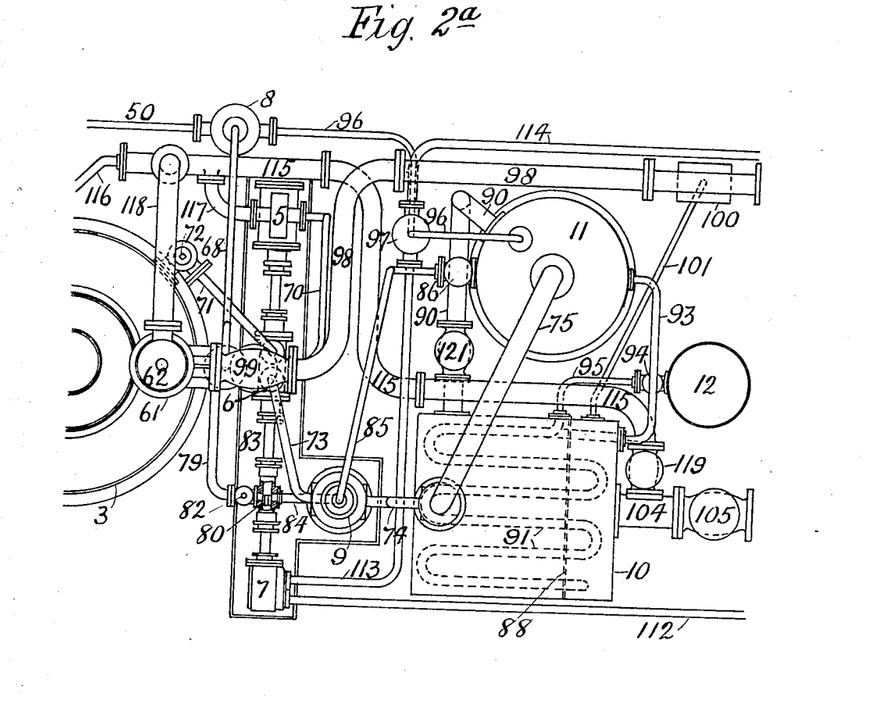
Figure 2B:
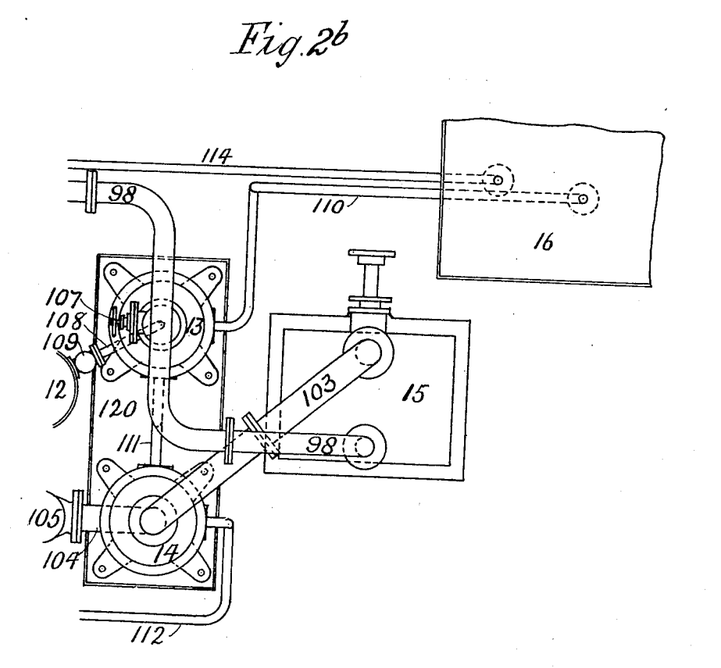
Figure 3:
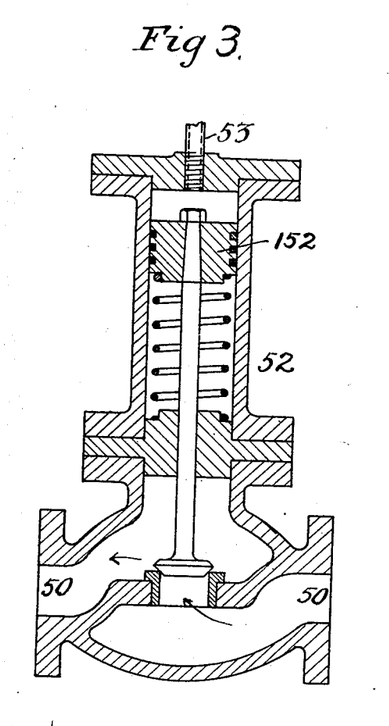

53 is a pipe from top of the boiler 3 to the valve 52. The pressure from the boiler is transmitted through said pipe 53 to the piston 152 in the valve 52 to control the passage to motor 49 in such a manner that the passage through said valve 52 is increased or decreased as the pressure in the boiler 3 falls or rises, thus controlling the speed of the blower 4, and therefore the supply of air to the gas producer 2.

54 is a stop valve in pipe 53.

The boiler 3 is of vertical type of known construction but with the fire box altered and only one baffle plate used.

55 is the baffle plate to prevent priming.

56 is the fire box with four or more water tubes 57 between side and top of fire box. Into the firebox there depend hanging tubes 58 with bottom ends closed and each containing a small tube 59 open at both ends, through which the water circulates.

60 are uptake tubes some of which form stays.

Pieces of fireclay or other suitable material are piled on the grate 41.

61 is a dome and water separator. 62 safety valve. 63 feed regulator having a float 64 which actuates an equilibrium valve 65 over the port 66.

67 is the valve casing, 68 supply pipe to valve casing 67 from the ammonia vapor receiver 8.

69 is a stop valve on supply pipe 70 to the working cylinder 5 of pump 6.

71 is the feed or delivery pipe from pump 6 to boiler 3. 72 stop non-return valve on pipe 71.

73 is the supply or suction pipe to pump 6 from the heat exchanger 9.

74 is a pipe to the heat exchanger 9 from pipe 75 which connects the bottom of the weak solution absorber 11 to the top of the strong solution absorber 10. The end 76 of pipe 75 may be provided with a valve which prevents any liquid rising.

Instead of the pipes 71, 73, 74 being arranged as shown on the drawings where the path of the solution is by 74, 9, 73, 6, 71 to boiler 3, they may be arranged so that the path is by 74, 6 to bottom of tube chamber of 9, then from top of tube chamber by valve 72 to 3.

77 indicates tubes in heat exchanger 9. 78 tube plates. 79 pipe from bottom of boiler 3 conveying hot weak solution to measuring valve 80. 81 stop valve on pipe 79. 82 regulating valve for valve 80. 83 bedplate for parts 5, 6, 7, 9.

84 is a pipe from measuring valve 80 to bottom of heat exchanger 9. The liquid passes from pipe 84 through the tubes of the exchanger 9 thence through pipe 85 to bottom of weak solution absorber 11.

86 is a non return valve on 85.

The strong solution absorber 10 consists of a rectangular box with partition plates 87 with openings at alternate ends.

88 is a vertical perforated plate in bottom chamber of absorber 10.

Figure 4:
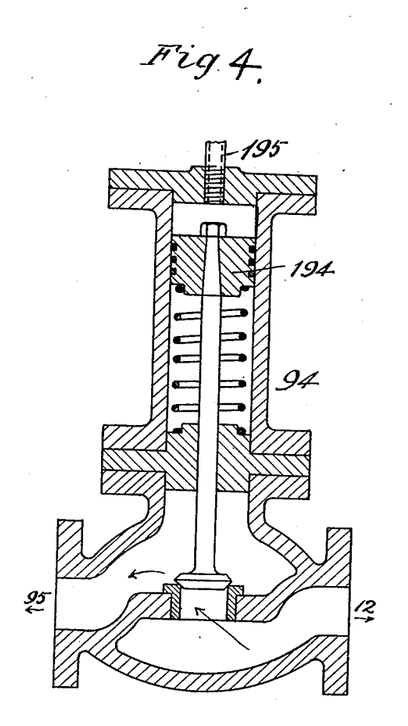

11 is a vertical cylinder closed at top and bottom and with a horizontal perforated plate 89 at a distance from the bottom; 90 is a pipe connecting the upper part of the absorber 11 to the bottom of the absorber 10. 91 coils for cooling solution in absorber 10 and 92 coils for cooling solution in absorber 11. 93 pipe connecting top of coils 91 to bottom of coils 92. 94 shown on enlarged scale in Fig. 4 is an expansion or flash valve on side of the receiver of anhydrous liquid ammonia 12.

The ammonia gas is liquefied in the condenser 13 in order to cool the absorbers and the anhydrous ammonia is stored in the receiver 12. The expansion or flash valve 94 is a spring released valve having a piston 194 in a cylinder communicating by pipe 195 with the pressure in the coils 91 and 92 which pressure closes the valve the spring opening it to admit more ammonia to the coils when the pressure falls.

95 is a pipe from valve 94 to coils 91. 96 pipe from top end of coils 92 passing through stand pipe 97 to ammonia vapor receiver 8.

98 is a pressure supply pipe from dome 61 to the motor or engine 15. 99 stop valve on pipe 98. 100 water separator on pipe 98.

101 is a drain pipe from water separator 100 to bottom of absorber 10. 102 stop valve on pipe 101. 103 exhaust from motor 15. The exhaust from the principal motor 15 passes through tubes of cooler 14, thence by pipe 104 discharging into bottom of absorber 10.

105 is a non-return valve on pipe 104. 106 pipe from pressure supply pipe 98 to top of condenser 13. 107 stop valve on pipe 106. 108 pipe from bottom of condenser 13 to the anhydrous liquid ammonia receiver 12. 109 stop non-return valve on pipe 108.

110 is a circulating water pipe from tank 16 to bottom of tube chamber of condenser 13, thence by pipe 111 from top of chamber 13 to bottom of tube chamber of 14 thence from top of this tube chamber 14 to pump 7 by pipe 112.

113 is a pipe for return of circulating water from pump 7 to bottom of stand pipe 97, thence from top of pipe 97 to tank 16 by pipe 114.

115 is an exhaust pipe. 116 exhaust pipe from the motor 49 leading into pipe 115.

117 is an exhaust from the cylinder 5 leading into pipe 115. 118 pipe from safety valve 62 to pipe 115.

119 is a non return valve on pipe 115.

120 is a bedplate for parts 13 and 14. 121 a non return valve on pipe 90.

The apparatus thus far described operates as follows:— The amount of inflammable gas developed in the gas-producer 2 and fed to the grate of the boiler depends upon the action of the air blower 4 which supplies air to the gas producer 2. The action of the blower depends upon the ammonia motor 49 which drives it and is fed from the receiver 8 of ammonia vapor through the pipe 50. The spring release valve 52 in the pipe 50 is however controlled by the pressure in the boiler 3 and consequently the action of the motor 49, of the blower 4, and of the gas producer 2 depends on the pressure prevailing in the boiler 3. The water containing ammonia in solution in the boiler 3 being subjected to heat the ammonia is driven out under pressure and passes by the dome 61 and pipe 98 to the motor 15. The exhaust from the motor 15 passes by pipe 103 to the cooler 14. Some of the ammonia gas under pressure from pipe 98 descends by branch 106 to the condenser where it is liquefied under pressure to supply the receiver 12. From the receiver 12 the liquefied ammonia passes through the flash valve 94 into the pipe system 95, 91, 93, 92, 96 when the pressure in this pipe system permits. In this pipe system the gas expands and cools the absorbers 10 and 11. The ammonia gas passes on to the receiver 8 which supplies the motor 49 through the pipe 50 and the motor 5 through the pipes 68 and 70 when the float valve 65 permits. The motors 49 and 5 exhaust into the pipe 115 by the pipes 116 and 117 respectively and the exhaust from the principal motor 15 passes by pipes 103 and 104 to join the pipe 115. The exhaust from the three motors then enters at the bottom of the absorber 10.

The pump suction is connected to the heat exchanger 9 by the pipe 73 and draws the cold strong ammonia solution from the absorber 10 and having received heat from the exchanger the strong ammonia solution is delivered into the boiler near the top through the pipe 71 at the same time a regulated quantity of hot weak ammonia solution is passing from the bottom of the boiler through the valve 81 pipe 79, measuring valve 80 and the pipe 84 at the bottom of the exchanger, and passing through the small tubes to the top is cooled and delivered through the pipe 85 into the bottom of the absorber 11. From the absorber 11 the surplus overflows through pipe 90 into the absorber 10 whence the strong ammonia solution is returned to the boiler as above mentioned. The weak solution from the bottom of the boiler is discharged by the pressure within through the valve 81 and a measuring contrivance which in the example illustrated consists of the valve 82 and the automatic valve 80. Valves 81 and 82 are operated by hand, valve 81 being intended as a general stop cock, and valve 82 as an adjustment valve for regulating the flow (when valve 81 is open) to the automatic valve 80. The latter is formed by a reduced part on the rod 83 which is connected to the piston of pump 6 so that at each stroke of the pump piston this valve 80 is opened and closed. The valves 82 and 80 operate as a measuring valve by means of which the amount of spent solution allowed to pass out of the boiler may be regulated in proportion to the amount of strong solution that is delivered into the boiler by the pump in order that the water level in the boiler may be maintained at a constant or practically constant level. For this purpose the attendant, watching the water level, will regulate the hand valve 82 until the outflow is proportionate to the inflow at the speed at which the pump 6 is working. The water pump 7 on the same bedplate circulates the cooling water from the tank 16.

Passing through the perforated plate 88 the gas will pass below the baffle plate 87 to the opening at the left (as seen in the drawings) of the tank, the direction of the gas is now changed to the right of the tank and to the opening at the end of the next baffle plate again rising and returning to the other end and so on. Should any ammonia gas now remain unabsorbed in the water in the tank it will pass out by the pipe 75 and into the bottom of the absorber 11 at 76 the gas will rise through the perforated plate 89 and owing to the weakness of the solution contained in this tank 11 any remaining gas must be rapidly absorbed by the water therein.

The weak ammonia solution from the exchanger 9 enters 11 by the non-return valve 86 and the strong ammonia solution which has been pumped from 10 is replaced by the liquid from the top of the absorber 11 through the down pipe 90 and passing through the non-return valve 121 it enters the bottom of the absorber 10.

The cooler 14 acts to cool the exhaust from the motor 15 so that it may be more readily absorbed in the water in the absorbers 10 and 11.

The anhydrous liquid ammonia stored in the receiver 12 and admitted to the refrigerating coils 91 and 92 in the absorbers 10 and 11 through the flash valve 94 which is actuated by the pressure in the coils, leaves the coils by the pipe 96 which descends the casing 97 up which the warm water from the cooler 14 and condenser 13 is being returned to the water tank 16 by the pump 7. This water is cooled by the low temperature of the evaporated ammonia. The ammonia vapor is passed on through the pipe 96 to the receiver 8.

The ammonia solution feed pump 6 is regulated by the float in 63 which actuates the equilibrium valve 65 over the port admitting the ammonia vapor through the pipe 68 and from the receiver 8 so that the pump is driven when the liquid in the boiler has descended.

It is necessary to maintain a constant specific gravity or strength of ammonia in the boiler thus the same rod or shaft which actuates the feed should also control the discharge.

The pump should be so constructed that it will come to rest only at the ends of the stroke so that the measuring valve will be closed when not working.

Rocking valves or others may be used for measuring but all must be actuated by the pump rod or shaft.

The non-return valve fixed in the pipe 75 say at the foot in 11 near the perforated plate 89 will prevent the liquids becoming mixed should a vacuum occur between the two absorbers.

What I claim as my invention and desire to secure by Letters Patent of the United States is:—

1. A continuous cycle ammonia power apparatus comprising in combination, a boiler for evaporating ammonia from solution, a condenser connected therewith for liquefying part of the evaporated ammonia, absorbers, heat absorbing vessels in said absorbers, a flash valve intermediate between the condenser and heat absorbing vessels, an equilibrium valve in communication with said vessels, mechanism whereby the equilibrium valve is governed by the water level in the boiler, an ammonia solution circulating pump intermediate between the boiler and absorbers a motor for said pump fed from the equilibrium valve, and a measuring valve for letting off spent solution from the boiler proportionate to the pump feed thereto.

2. A continuous cycle ammonia power apparatus comprising in combination a boiler for evaporating ammonia from solution, a condenser connected therewith for liquefying part of the evaporated ammonia, absorbers, heat absorbing vessels in said absorbers, a flash valve intermediate between the condenser and heat absorbing vessels, an equilibrium valve in communication with said vessels, mechanism whereby the equilibrium valve is governed by the water level in the boiler, an ammonia solution circulating pump intermediate between the boiler and absorbers and a motor for said pump fed from the equilibrium valve, together with a gas producer, an air feed therefor controlling the gas produced, a burner fed by said producer for heating the boiler, an auxiliary motor for said air feed connected to the heat absorbing vessels to be driven by the expanded ammonia therefrom, a control valve in said connection whereby the action of the air feed motor depends upon the pressure in the boiler, a direct connection between the boiler and auxiliary motor and a hand valve in said direct connection.

3. A continuous cycle ammonia apparatus comprising in combination a boiler for evaporating ammonia from solution, a condenser connected therewith for liquefying part of the evaporated ammonia, absorbers, heat absorbing vessels in said absorbers, a flash valve intermediate between the condenser and heat absorbing vessels, an equilibrium valve in communication with said vessels, mechanism whereby the equilibrium valve is governed by the water level in the boiler, an ammonia solution circulating pump intermediate between the boiler and absorbers and a motor for said pump fed from the equilibrium valve together with a measuring valve for governing the discharge of weakened ammonia solution from the boiler operated in connection with the said pump.

In witness whereof I have signed this specification in the presence of two witnesses.

JOHN ROBSON.

Witnesses:
J. G. DAWSON,
R. SMITH.